Aug. 5, 1941.  P. W. KLIPSCH  2,251,549
MIXING CIRCUIT FOR ELECTRICAL PROSPECTING
Filed Aug. 25, 1938
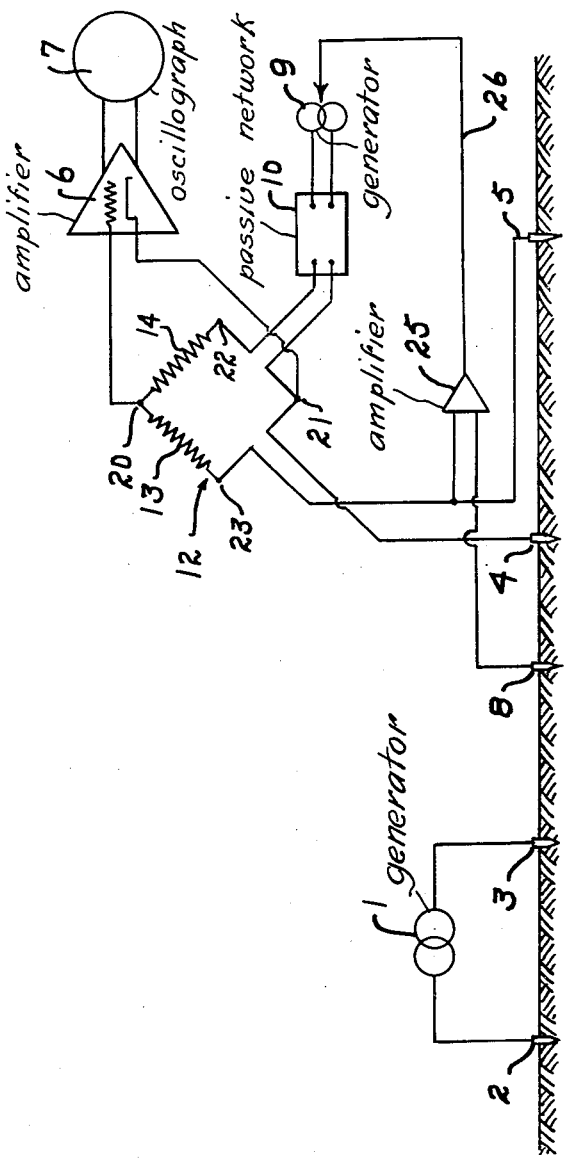
Inventor
PAUL W. KLIPSCH
Jesse R. Stone
Lester B Clark
Attorney Patented Aug. 5, 1941

2,251,549

UNITED STATES PATENT OFFICE 2,251,549

MIXING CIRCUIT FOR ELECTRICAL PROSPECTING

Paul W. Klipsch, Houston, Tex., assignor to E. E. Rosaire, Houston, Tex.

Application August 25, 1938, Serial No. 226,669

12 Claims. (Cl. 175—182)

This invention relates to geo-electric prospecting with electric transients or impulses with steep wave fronts.

An object is to provide means for superposing an electric impulse of predetermined wave form upon a detected impulse so the wave form of the detected impulse may be measured.

A more specific object is to provide such superposition means whereby the superposition is linear without the necessity of either impulse to pass through an amplifier before mixing.

A further object is to perform the mixing or superposition without interaction, that is without either wave having an effect upon or modifying the other.

An object is to provide synchronism between the source of the impulse with the detected impulse without radio or wire line communication and with negligible feed-back from the synchronized impulse to the synchronizing control potential.

Still another object is to provide a geo-electric prospecting system in which stray capacitances, that would cause non-uniformity in performance, are avoided.

Other and further objects and advantages of the invention will be apparent from the following description taken in connection with the single figure of the accompanying drawing which illustrates a form of apparatus for carrying out the invention.

Referring to the drawing reference numeral 1 represents an electric generator adapted to produce a current impulse of suitable wave shape to flow in the earth between electrodes 2 and 3. The generator 1 may be a grid controlled gas discharge tube such as a "Thyratron" or "Phanatron," supplied with direct current and a control potential whereby a sudden direct current impulse may be applied to the earth. In a variation a switching means may be provided by additional tubes or relays to produce the impulses periodically, such as described by A. W. Hall in Physics IV, 1933, pp 66–75.

Detection electrodes 4 and 5 serve to detect the potential produced by the current impulses, and the wave form of the potential may be observed and/or recorded by means of oscillograph 7 after suitable amplification in repeater 6. In order to observe the wave form, it is compared with that of a locally generated impulse.

Generator 9 produces impulses of substantially the same wave form as generator 1, and passive network 10 suitably modifies this wave form so that it matches the detected wave. While the network 10 may comprise any of various suitable forms, it is contemplated that this network shall preferably be constructed in accordance with the disclosure in copending application for patent by Klipsch et al. for Wave synthesizing network, Serial Number 226,668 filed August 25, 1938.

In the present invention mixing or superposition takes place in a bridge circuit 12 before any amplification and attendant distortion has taken place. The detected potential and locally generated potential are connected in arms of a bridge with impedances which are shown as resistors 13 and 14 forming the other two arms. The wave form indicating means comprising the repeater 6 and the recording means 7 is connected across the diagonal between points 20 and 21, as shown, or across the other diagonal between points 22 and 23 with the polarity of either potential reversed and will therefore indicate a null when the detected and locally generated potentials have the same amplitude and wave shape and are in synchronism.

It should be noted that the bridge circuit 12 is a passive network in that no amplification occurs therein and that the elements thereof are linear since the current is proportional to voltage. The expressions "passive" and "linear" are conventional to the art. T. E. Shea in "Transmission Networks and Wave Filters," Van Nostrand, 1928, Chapter 11, page 43, defines a passive network as one which contains no internal sources of power and a linear network as one whose circuit parameters do not vary with current. A discussion of linear elements also appears on pages 22, 23 of "Operational Circuit Analysis" by V. Bush, John Wiley and Sons.

The use of the bridge circuit as just described is highly desirable as such arrangement permits grounding of either or both the generator 9 and the repeater 6 without introducing any disturbing influences that would obscure the results sought.

In order that generator 9 be in synchronism with the incoming potential, the latter may be used as a control potential acting through a repeater 25 and an electrical connection 26 to control the ignition of the discharge tubes in generator 9, the repeater 25 being connected to electrodes 5 and 8. If the detected potential contains noise or other impulses which will cause occasional misfiring and hence give rise to irregular synchronization, the electrode 8 being nearer to the electrode 3 than is electrode 4 will increase the signal-to-noise ratio whereby synchronization will have a small, controllable lead or advance. If this refinement is not desired, electrode 8 may be omitted and repeater 25 connected to electrodes 4 and 5.

In order to explain the fact that no feed-back or interlocking occurs it may be assumed that resistors 13 and 14 are 500,000 ohms each, that the earth's resistance between electrodes 4 and 5 is 1000 ohms and that the impedance looking into network 10 from the left does not exceed 1000 ohms. When balance is approached, the voltage output from the network 10 is within a few percent of the potential detected between electrodes 4 and 5. Assume this latter potential to be 10 millivolts.

If the network 10 produces 10 millivolts also, then approximately .01 millivolt will appear across the input to amplifier 25 due to potential from this network. This is only 0.1% of the detected potential and therefore does not contribute appreciably to the synchronizing control. In other words no interlocking will occur. It is to be understood that the foregoing values for resistances and voltages are illustrative only and should not therefore be considered as limiting the invention.

Control of synchronization by means of radio or by wire lines has been proposed. Certain inherent advantages of such means are offset at least in part by serious difficulties. In case of radio, the transmitter induces several volts of radio frequency in the lines connecting the electrodes 4 and 5 with the indicating instrument, and in the presence of chemical contact between electrodes and ground, and rectification in the amplifying system, several millivolts of rectification (demodulation) products enter the amplifier in such a way as to be superposed on the potential due to the current produced by the generator 1. This results in errors of measurement both of steady state amplitude and of wave form distortion.

In a similar manner wire lines, consisting for example of a pair of wires from generator to receiver to furnish synchronizing potential, will act as a single conductor with earth return to form a line over which additional potentials will be produced between electrodes 4 and 5 which have no relation to the potentials normally detected. The result is frequently a wave shape entirely different from that which would have been encountered in the absence of such a wire line.

If the detected potential were first amplified and then mixed with or superposed upon the local potential, as has previously been proposed, variable amounts of distortion will take place depending upon the characteristics of the active network (amplifier), the state of battery voltages, the condition of the thermionic tubes in the amplifier and other factors.

Similarly, if the detected potential, the locally generated potential and the repeater be interconnected in series or delta, capacitances between one earth point and another lend to both instability and errors in wave shape.

The difficulties just enumerated are eliminated in accordance with the teachings of the present invention which is also instrumental in accomplishing the stated objects as well as additional objects apparent from the foregoing description directed to an embodiment of the invention. It is obvious that the bridge method of the present invention is capable of keeping the capacitance across the detected potential as low as the input capacitance of an amplifier and also that there exists no stray capacitances which would cause non-uniformity in performance, since all apparatus may be grounded to the same earth point.

The invention claimed is:

1. The method of prospecting with varying electrical current which comprises causing current to flow in the earth's crust, detecting the potential in a region subject to such current, mixing in a linear passive network the detected potential, before amplification thereof, with a synthetic potential, indicating the wave form of the mixed potentials, and maintaining the synthetic potential in synchronism with the generated potential by controlling the generation thereof with the amplified detected potential.

2. The method of prospecting with varying electric current comprising the steps of causing a varying current to flow in the earth, detecting the potential between points in the area within which the current flows, generating a potential similar in wave form to the wave form of the detected potential, superposing said potentials, prior to the subjection of either potential to the influence of an active network, in a linear passive network, and indicating the wave form of the resultant potential.

3. The method of electrical prospecting which comprises, causing an electric current to flow in the earth's crust, detecting the potential between points in the area within which the current flows, generating a potential similar in wave form to the wave form of the detected potential, superposing such potentials, indicating the wave form of the resultant potential, and synchronizing the generated potential with the detected potential by controlling the generation thereof with a second detected potential having a greater signal-to-noise ratio than the first mentioned potential.

4. In the method of geophysical prospecting wherein an electric current is caused to flow in the earth and potential is detected between spaced points in the area of current conduction, the wave form of such potential being determined by generating and superposing a second potential upon the detected potential and determining the wave form of the resulting potential, the step of synchronizing the second potential with the detected potential by controlling the generation thereof with a potential between points which are differently spaced than are the points of detection.

5. In combination, means for passing electric impulses through the earth, means for detecting potential between spaced points in the area of current conduction, means for generating a potential in synchronism with the detected potential, a bridge having said sources of potential constituting two arms thereof, and indicating means connected across one diagonal of the bridge.

6. In combination, means for passing electric impulses through the earth, means for detecting potential between spaced points in the area of current conduction, means for generating a second potential, a bridge having said sources of potential constituting two arms thereof, indicating means connected across one diagonal of the bridge, and means operable from the detected potential to synchronize said generating means with the first mentioned means.

7. In combination, means for causing periodic current impulses to flow in the earth, a generator, a pair of detection electrodes embedded in the earth, a bridge having connection to said generator and electrodes, a pair of impedances, so that said potential sources with the impedances constitute the arms of said bridge, and indicating means connected across a diagonal of the bridge to indicate wave form of the superposed impulses from the generator and the detection electrodes.

8. In combination, means for causing intermittent current impulses to flow in the earth, a generator, a pair of detection electrodes embedded in the earth, a bridge comprising said generator, the earth between the potential electrodes and a pair of impedances, and indicating means connected across a diagonal of the bridge to indicate wave form of the superposed impulses from the generator and the detection electrodes.

9. In combination, means for causing a current impulse to flow in the earth, a generator, a pair of detection electrodes embedded in the earth, a bridge comprising said generator, the earth between the potential electrodes and a pair of impedances, and indicating means connected across a diagonal of the bridge to indicate wave form of the superposed impulses from the generator and the detection electrodes.

10. In combination, means for causing electric current impulses to flow in the earth, a generator, a pair of detection electrodes embedded in the earth to detect potential between points in the area of current conduction, a pair of impedances, means interconnecting said generator, electrodes and impedances to form a bridge circuit, indicating means connected across a diagonal of the bridge to indicate wave form of the superposed impulses from the generator and the detection electrodes, and means operable from the potential between the detection electrodes to synchronize the generator with said first mentioned means.

11. In combination, means for passing current impulses through the earth, means for detecting potential between spaced points in the region of current conduction, an impedance in series with said detection means, means for generating a potential in synchronism with the detected potential, a second impedance in series with said last mentioned means, means for connecting in parallel the detected and generated potentials and their series impedances, and across the so formed parallel circuit an indicating means.

12. An apparatus for geophysical prospecting comprising a generator adapted to feed current impulses into the earth; a pair of detection electrodes adapted to be arranged in spaced relation at a distance from said generator, a second generator of current impulses, a bridge including as adjacent arms the earth electrodes and the second generator, impedances arranged in the other adjacent arms of the bridge having impedance values high compared to the impedance values of the first mentioned adjacent arms and indicating means connected across a diagonal of the bridge drawn between the points of intersection of the arms of each pair in such a way that the indicating means, one earth electrode and the second generating means all have a common ground.

PAUL W. KLIPSCH.